(12) United States Patent
Hamann et al.

(10) Patent No.: US 10,938,572 B2
(45) Date of Patent: Mar. 2, 2021

(54) REVOCABLE BIOMETRIC-BASED KEYS FOR DIGITAL SIGNING

(71) Applicant: INTERNATIONAL BUSINESS MACHINES CORPORATION, Armonk, NY (US)

(72) Inventors: Matthew Hamann, Raleigh, NC (US); Peter Szeto, Durham, NC (US); Cody Walker, Raleigh, NC (US); Siddharth Goyal, Glen Allen, VA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 399 days.

(21) Appl. No.: 15/866,674

(22) Filed: Jan. 10, 2018

(65) Prior Publication Data

US 2019/0215164 A1   Jul. 11, 2019

(51) Int. Cl.
*H04L 29/06* (2006.01)
*H04L 9/32* (2006.01)
*H04L 9/08* (2006.01)

(52) U.S. Cl.
CPC .......... *H04L 9/3247* (2013.01); *H04L 9/0866* (2013.01); *H04L 9/0891* (2013.01); *H04L 9/0894* (2013.01); *H04L 9/3231* (2013.01); *H04L 9/3271* (2013.01)

(58) Field of Classification Search
CPC ... H04L 9/3247; H04L 9/3231; H04L 9/0866; H04L 9/0894; H04L 9/0891; H04L 9/3271
See application file for complete search history.

(56) References Cited

U.S. PATENT DOCUMENTS 5,210,795 A    5/1993   Lipner et al.
5,793,868 A    8/1998   Micali
(Continued)

FOREIGN PATENT DOCUMENTS

WO    WO-2019081145 A1 *  5/2019   ............ G16B 20/00

OTHER PUBLICATIONS

Boneh, et al., "A Method for Fast Revocation of Public Key Certificates and Security Capabilities", Proceedings of the 10th USENIX Security Symposium, Washington, D.C., USA, Aug. 13-17, 2001 (pp. 1-13).

(Continued)

*Primary Examiner* — Chau Le
*Assistant Examiner* — Han Yang
(74) *Attorney, Agent, or Firm* — William H. Hartwell, Esq.; Kevin P. Radigan, Esq.; Heslin Rothenberg Farley & Mesiti P.C.

(57) ABSTRACT

Revocable biometric-based keys for digital signing are provided by, in part, generating a revocable public key at a secure device and transmitting the public key to a registration system for registration to facilitate linking the public key to the secure device user's identity for use in accessing a protected resource. Generating the revocable public key may include generating a salt, storing the salt on the secure device, and temporarily obtaining, by the secure device, biometric data of the user of the secure device. The biometric data is obtained from user biometrics, and the temporarily obtaining is absent storing the biometric data in persistent storage. A public and private key pair is generated at the secure device based, at least in part, on the stored salt and the user's temporarily obtained biometric data.

14 Claims, 7 Drawing Sheets

(56) References Cited

U.S. PATENT DOCUMENTS

| | | | |
|---|---|---|---|
| 7,010,683 B2 | 3/2006 | Corella | |
| 9,473,494 B2 | 10/2016 | Plotkin et al. | |
| 9,509,690 B2 | 11/2016 | Carter et al. | |
| 2006/0020811 A1* | 1/2006 | Tan | H04L 9/0891 |
| | | | 713/180 |
| 2007/0050303 A1* | 3/2007 | Schroeder | H04L 9/3231 |
| | | | 705/67 |
| 2012/0019379 A1* | 1/2012 | Ben Ayed | G08B 13/1436 |
| | | | 340/539.1 |
| 2014/0237256 A1* | 8/2014 | Ben Ayed | H04L 9/0866 |
| | | | 713/186 |
| 2015/0195278 A1* | 7/2015 | Plotkin | H04L 9/3271 |
| | | | 713/186 |
| 2017/0085562 A1* | 3/2017 | Schultz | G06K 9/00093 |
| 2019/0238344 A1* | 8/2019 | Kaga | G06F 21/32 |
| 2020/0145409 A1* | 5/2020 | Pochuev | H04W 4/70 |

OTHER PUBLICATIONS

Mel, et al., "The NIST Definition of Cloud Computing," National Institute of Standards and Technology, Information Technology Laboratory, Special Publication 800-145, Sep. 2011, (pp. 1-7).

Scheirer, et al., "Beyond PKI: The Biocryptographic Key Infrastructure", Security and Privacy in Biometrics, Springer London, 2013 (pp. 1-6).

International Business Machines Corporation (IBM), "z/Architecture Principles of Operation," IBM® Publication No. SA22-7832-10, Eleventh Edition, Mar. 2015, (pp. 1-1732).

International Business Machines Corporation (IBM), "Power ISA™ Version 2.07B," International Business Machines Corporation, Apr. 9, 2015, (pp. 1-1527).

Kleppmann et al., "Strengthening Public Key Authentication against Key Theft", 9th International Conference on Passwords, Cambridge, UK, Dec. 8, 2015 (pp. 1-6).

Laser et al., "Enhanced Security Mechanism in Public Key Cryptosystems Using Biometric Person Authentication", 2016 International Conference on Computation of Power, Energy Information and Communication (ICCPEIC), 2016 (pp. 170-176).

Dinca et al., "User-Centric Key Entropy: Study of Biometric Key Derivation Subject to Spoofing Attacks", Entropy 19.2, 2017 (pp. 1-21).

* cited by examiner

REVOCABLE BIOMETRIC-BASED KEYS FOR DIGITAL SIGNING

BACKGROUND

Public key cryptography, or asymmetric cryptography, refers generally to any cryptographic system that uses pairs of keys, that is, public keys which may be publicly disseminated, and private keys which are known only to the user. Public key cryptography accomplishes two functions. First, the approach provides authentication when the public key is used to verify that a holder of the paired private key sent the message, as well as encryption, whereby only the holder of the paired private key can decrypt the message encrypted with the public key. In a public key signature system, a person can combine a message with a private key to create a digital signature on the message.

Biometric authentication using biometric data is another security process that relies on unique biological characteristics of the user to verify the user's identity. Typically, biometric authentication systems compare biometric data captured to stored, confirmed authentic biometric data in a database. If both data sets match, authentication is confirmed. A variety of biometric reader technologies exist today including, for instance, retina scans, iris recognition, fingerprint scanning, facial recognition and voice identification.

SUMMARY

The shortcomings of the prior art are overcome and additional advantages are provided through the provision, in one embodiment, of a method which includes: generating a revocable public key at a secure device, and transmitting the public key to a registration system for registration to facilitate linking the public key to the user's identity for use in accessing a protected resource. Generating the revocable public key includes generating a salt, and storing the salt on the secure device, as well as temporarily obtaining by the secure device, biometric data of the user of the secure device. The biometric data is obtained from user biometrics, and the temporarily obtaining is absent storing of the biometric data in persistent storage. The secure device generates a public key and private key pair based, at least in part, on the stored salt and the biometric data obtained from the user.

Systems and computer program products relating to one or more aspects also described and claimed herein. Further, services relating to one or more aspects may also be described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
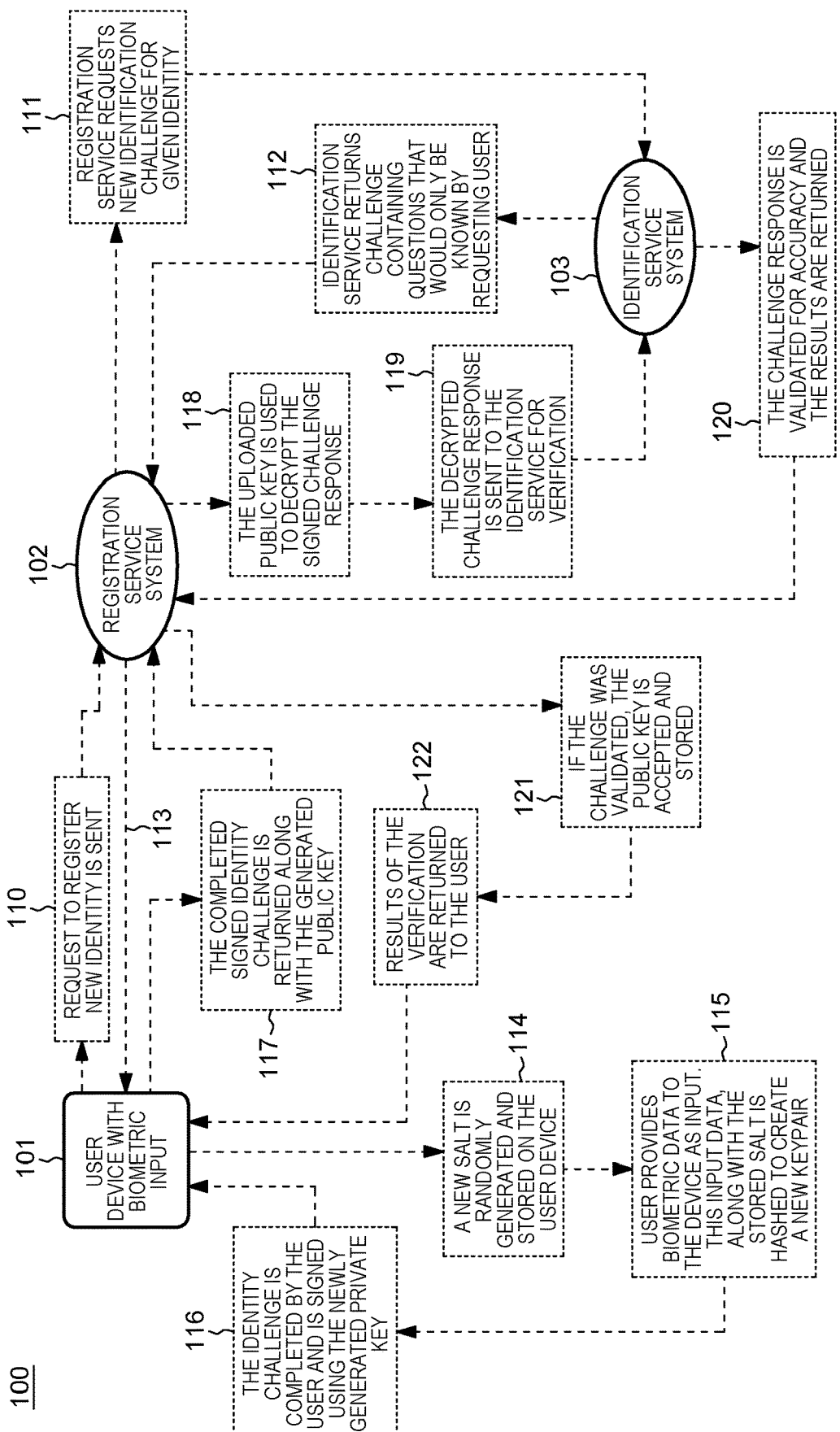
FIG. 1 depicts one embodiment of a registration process within a distributed trust network, in accordance with one or more aspects of the present invention.

Aspects of the present invention and certain features, advantages and details thereof, are explained more fully below with reference to the non-limiting example(s) illustrated in the accompanying drawings. Descriptions of well-known systems, devices, processing techniques, etc., are omitted so as to not unnecessarily obscure the invention in detail. It should be understood, however, that the detailed description in this specific example(s), while indicating aspects of the invention, is given by way of illustration only, and not by way of limitation. Various substitutions, modifications, additions, and/or arrangements, within the spirit and/or scope of the underlying inventive concepts will be apparent to those skilled in the art from this disclosure. Note further that numerous inventive aspects and features are disclosed herein, and unless inconsistent, each disclosed aspect or feature is combinable with any other disclosed aspect or feature as desired by a particular application, for instance, to facilitate real-time generating and using revocable biometric-based keys for digital signing.

The illustrative embodiments may be described using specific code, designs, architectures, protocols, layouts, schematics, or tools only as examples, and are not limiting to the illustrative embodiments. Furthermore, the illustrative embodiments may be described in some instances using particular software, tools, and data processing environments only as example for clarity of the description. The illustrative embodiments may be used in conjunction with other comparable or similarly purposed structures, systems, applications, or architectures. An illustrative embodiment may be implemented in hardware, software, or a combination thereof The examples in this disclosure are used only for clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed herein.

There are a number of issues associated with public key cryptography. For instance, one issue is confidence or proof that a particular public key is authentic, and that is correct and belongs to the user claimed, and has not been tampered with or replaced by a malicious third party. Further, in many cases, a user is required to create and maintain multiple sets of credentials for each collection of secured resources they are trying to access (e.g., line of credit, user accounts, voting, etc.). Also, when authenticating against a resource provider, the resource provider is typically the sole holder of the credentials. This means that if those credentials are compromised, the user must rely on the service provider for resolution of the issue.

Further, biometric data is disadvantageously sensitive in nature and should not be shared directly with a resource provider, or stored in a centralized database, as might be required for a digital signing system. Further, if a biometric-based authentication vehicle is stolen, a malicious third party could then act using those credentials.

Today, compromised information, such as a compromised credit card number can leave the owner without recourse for a period of time while a new card is being prepared and forwarded to the user. Further, as the prevalence of minimalism continues to increase, carrying a wallet or purse with credit cards, identity information, etc., is often viewed less desirably. If a single device may take the place of most of the identification information carried in a wallet, it could be a significant advantage for consumers.

Advantageously, disclosed herein is a novel public key cryptography and use approach which is based on revocable biometric-based keys for digital signing. In one or more aspects, real time, on demand key generation is provided, along with the ability to immediately revoke and reissue a new public private key pair, for instance, into a system or network of trust based on the digital signing approach. The real time speed with which this process can occur is a significant advantage over existing approaches for replacing compromised information.

As explained herein, a consumer or user may use a single device, referred to herein as a secure device, to digitally sign and authorize various transactions (based, at least in part, on biometrics), as well as to revoke the public key associated with the biometrics in the event the key is compromised. This may be achieved, in part, by generating public key and private key pairs in real time, that is, on the fly, based on a salt generated and stored within the secure device, as well as biometric data obtained by the secure device from the user at the time of use. In the embodiments described herein, the biometric data is temporarily obtained by the secure device for use in generating, for instance, the public key and private key pair, and is not maintained by the secure device (or any other device or component) in persistent storage. If either the stored salt, or the biometric data is not present within the device, then the private key cannot be generated, and thus, a transaction cannot be digitally signed and authorized. Note that this assumes, in addition to not storing the biometric data on the device, that the private key is also not stored in persistent storage, but rather, is generated at the time of use, that is, at the time a transaction (e.g., request or response) is to be digitally signed.

In the event of a malicious attack which manages to compromise the public key (or the private key), the user could issue a revocation of the public key(s) known by the registration system and resource provider(s) system. From there, the user can generate a new public key private key pair by going through an identity verification process, as described further herein. Upon successful completion, the new public key(s) can be registered and, for instance, transmitted to the service provider system(s), or sent to a database of the distributed trust network for access by one or more service provider systems, after which the user may securely authorize requests for transactions using the new private key to digital sign.

In order to register a new public key with, for instance, a registration service system, the registration system can make use of a proof-of-knowledge challenge to initially verify a user's identity. For instance, the registration service may send an assigned challenge to the user requesting information that only the user should know. The user can generate a new public key and private key pair, and complete the challenge. The user then returns the signed completed challenge (signed using the private key), along with the newly generated public key. The new public key can then be used to decrypt the completed challenge. The data in the completed challenge may then be verified by the registration service system, and if the information is found to be valid, the new public key may be linked to the user's identity.

In one or more implementations, one or more registration service systems could form or support the network of trusted systems (or distributed trust network), to provide distributed access to public keys that can be used to verify user identities.

By way of example, a stored salt may be used in combination with the user's biometric data to generate a public key and private key pair. Upon creation of the public key, the public key may be distributed to the registration service system using a registration method such as described above. The secure device, that is, the user's secure device, does not maintain or store the private key or the biometric data, but rather discards the information after use. Only the initially generated salt value is stored at the secure device. This salt value may be used at digital signing time to regenerate the same private key by freshly obtaining the user's biometric data used to previously generate the public key and private key pair. A transaction, such as a request or response, sent by the user's device may be digitally signed using the newly regenerated private key, allowing the destination service, such as a service provider system, to authenticate the user. As explained herein, should the credentials be compromised, a personal verification process could be used to prove identity in association with regenerating a new set of public key and private key pairs based, in part, on the user's biometric data. Note that in generating a new public key private key pair, a new salt may be generated and used in combination with the newly obtained biometric data of the user.

FIG. 1 depicts one embodiment of a registration process within a distributed trust network 100, in accordance with one or more aspects of the present invention. In one or more embodiments, distributed trust network 100 may include one or more secure devices 101, with biometric input capabilities, one or more registration service systems 102, such as one or more registration servers, and one or more identification service systems 103 (as well as one or more service provider systems (as discussed further below)). Note that in one or more embodiments, registration service system 102 and identification service system 103 may be implemented in the same computing system or different computing systems (or servers) of the distributed trust network 100. Note also that one or more aspects of registration service system 102, as well as one or more aspects of the identification service system 103, may be cloud-based, and that the distributed trust network includes a communication network (not shown) for communicating between the one or more secure devices 101, the registration service system 102 and the identification service system, as well as one or more service or resource provider systems discussed herein. Also note that, in one or more implementations, the one or more secure devices 101 may be separate from, but capable of communicating with a distributed trust network which includes one or more registration service systems, one or more identification service systems and/or one or more service provider systems, such as disclosed herein.

In the example of FIG. 1, secure device 101 may be any user device capable of performing the actions described herein, such as, for instance, a desktop computing device, a server, a workstation, a mobile device, a laptop computer, a tablet computer, a smartphone, a personal digital assistant (PDA), or the like, which (as explained herein) has a biometric reader or biometric input facility such as, for instance, a retina scanner, iris recognition facility, fingerprint scanner, facial recognition facility and/or voice identification facility, associated therewith as desired for a particular application of the aspects disclosed herein.

By way of example, assume that the user's secure device 101 is initially unregistered, meaning that it does not have a saved salt. Those skilled in the art of cryptography will understand that a salt as used herein refers to random data that is used as an additional input to a function that "hashes" other data, such as a password or passphrase. In the case of the present invention, the salt is being used in combination with (for instance, to hash) the user's biometric data. Generating the salt for storing in the secure device will be readily implementable by one skilled in the art. Additionally, a variety of cryptographic hash functions exist, any one of which may be used in generating a public key and private key pair from the stored salt and biometric data, as discussed herein.

Note that the biometric data may be any set or subset of biometric data scanned, read, or otherwise input into the secure device from user biometrics, as desired for a particular application. Various approaches are known in the art for accurately scanning user biometrics to obtain repeatable biometric data such as discussed herein.

In the example of FIG. 1, secure device 101 sends a request to initiate a registration process for a new or given identity 110 to the registration service system 102. Registration service system 102 requests an identification challenge, for instance, from identification service system 103 for the given identity 111. Identification service system 103 returns a challenge containing one or more questions that would only be known by the user requesting the registration 112, and this challenge 113 is forwarded back to the user's secure device. Note that this process assumes that the user has previously registered or saved with the identification service system correct responses to one or more identification challenges, which may be used in the registration process.

Based on receiving the challenge, the secure device randomly generates and stores a new salt into local storage on the secure device 114. When the user completes the challenge, the secure device will use the newly stored salt, along with real-time biometric data obtained from the user to generate a public key private key pair 115. For instance, a standard cryptographic hash may be used to combine the stored salt and the biometric data obtained from biometrics of the user input to the device 115. The challenge response is then digitally signed by device 101 with the newly generated private key 116, and is sent along with the generated public key back to the registration service system 117. At this point, the public key and private key pair is discarded by the secure device, that is, they deleted from the secure device, and no longer available on the device. Note again neither the private key or the biometric data is maintained in persistent storage of the secure device.

Figure 2:
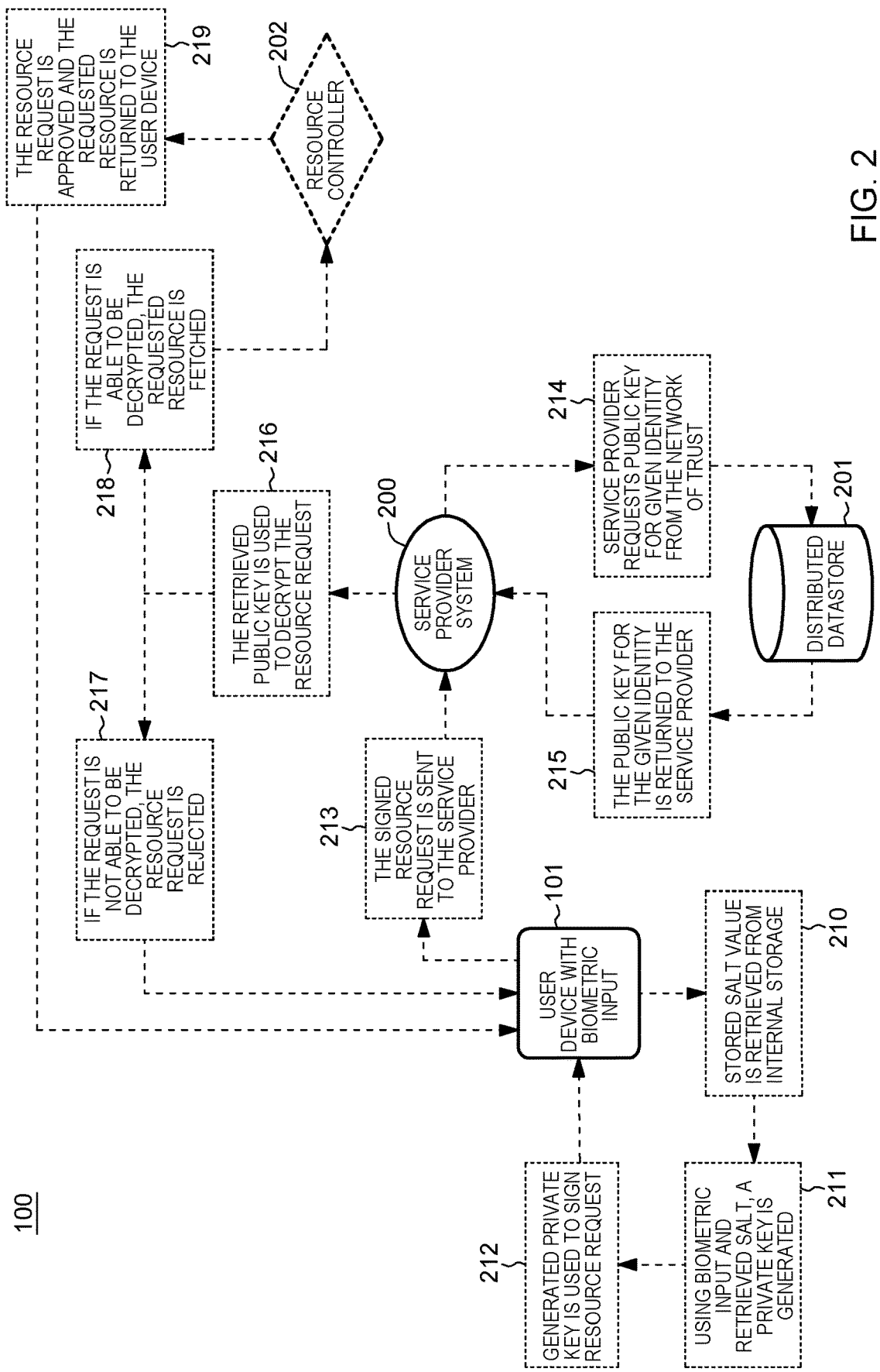
FIG. 2 depicts one embodiment of a biometric-based digital signing and validation process within a distributed trust network with a public key database, in accordance with one or more aspects of the present invention.

The registration service system decrypts the challenge response with the received public key 118, and the decrypted challenge response is forwarded to identification service system 103 for verification 119. The challenge response is validated for accuracy and the results are returned 120 to registration service system 102. If the challenge is validated, the public key is accepted and stored 121. Storing of the public key may either be locally at the registration service system, or in a database of the distributed trust network 100, such as shown in FIG. 2. Results of the verification check are returned to the user device 122. If the identity verification fails, the user device discards the stored salt. Otherwise, the stored salt may be used in the real time signing and revocation processes described below with reference to FIGS. 2-4.

FIG. 2 depicts one embodiment of a biometric-based digital signing and validation process within a distributed trust network 100, which (as noted) includes one or more service provider systems 200, and one or more distributed datastores or databases 201, as well as (depending on the implementation) the one or more secure devices 101. Note that service provider system 200 may be the provider system of one or more protected resources. In one embodiment, service provider system 200 may also be, or include, the registration service system and/or the identification service system capabilities described above in connection to FIG. 1. Alternatively, service provider system 200 may be a distinct computing entity within the distributed trust network 100 from the registration service entity and/or identification service entity. Note that the process of FIG. 2 assumes that the registration process (such as described above in connection to FIG. 1) has already been completed, and that there is a stored salt on the user device 101.

When a resource requiring authentication is required, the user device 101 uses the stored salt, and biometric data freshly obtained from user biometrics to regenerate the private key. Since the salt is unchanged from the initial registration process, and some biometric data is reobtained, the regenerated private key matches the public key and private key pair initially generated in the registration process. This assumes, in one or more embodiments, that the same cryptographic hash function is used to recreate the private key from the stored salt and the freshly obtained biometric data of the user.

As illustrated in FIG. 2, the process includes retrieving the stored salt value from internal device storage 210, and using the biometric input and retrieved salt to generate the private key 211. Once the private key is generated, the key is used to digitally sign the resource request 212, which is sent 213 to the service provider system 200. The service provider system requests the public key for the given identity from the network of trust 214, for instance, from an accessible distributed datastore 201 of the distributed trust network 100. The retrieved public key for the given identity is returned to the service provider system 215, and the public key is used to decrypt the incoming request 216. If the public key matches the generated private key, the request can be decrypted, and the request for the protected resource is considered valid 218. A resource controller 202 may be employed or accessed to return the requested resource 219 to the secure device 101. If the keys do not match, then the request is not able to be decrypted, and the resource request is rejected 217, with appropriate notice being returned to device 101. In one or more implementations, after a relatively short period of time, the public key may be discarded by the service provider. In this way, any subsequent request from the user will require retrieval of the public key again from the distributed datastore.

Figure 3:
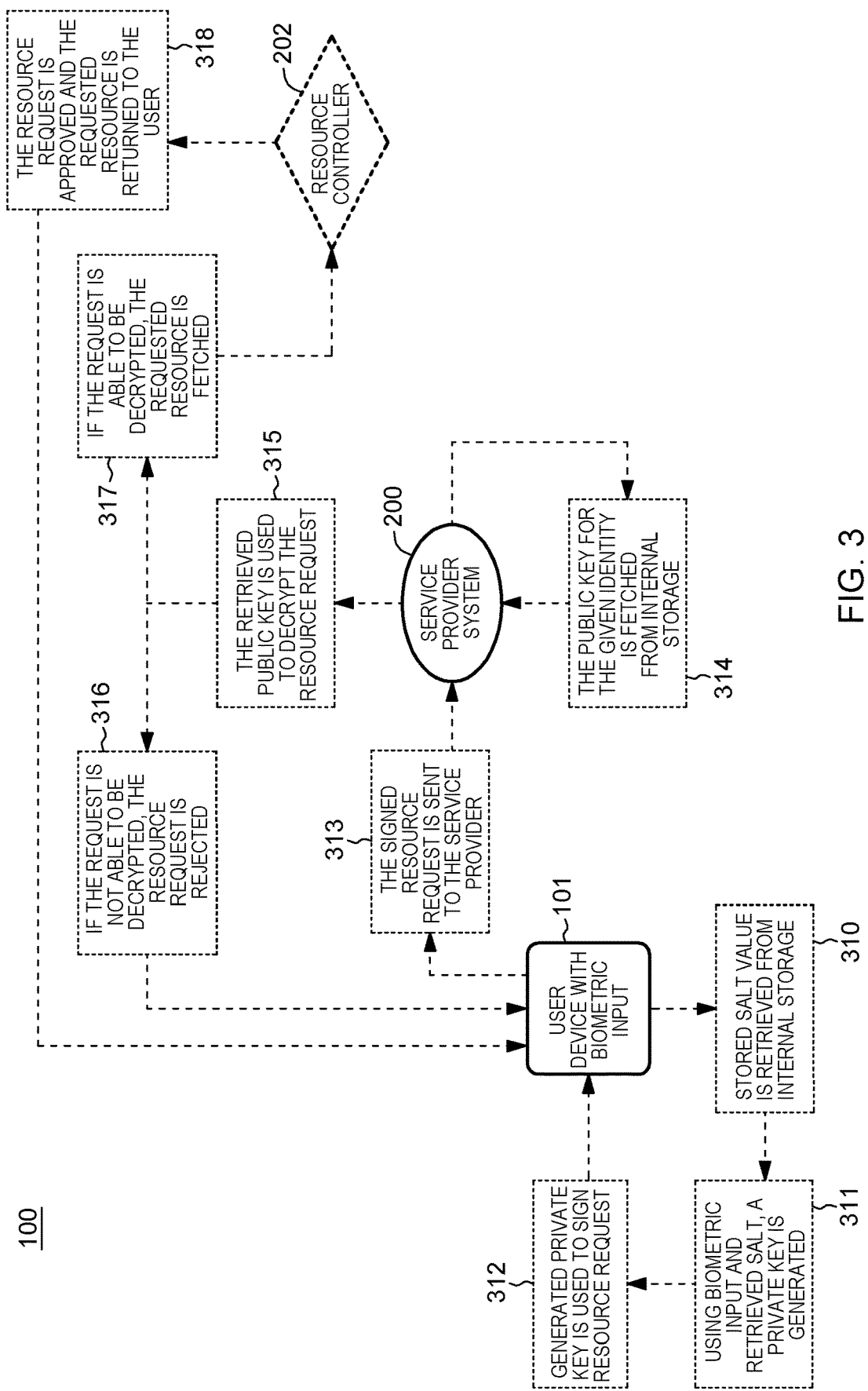
FIG. 3 depicts another embodiment of a biometric-based digital signing and validation process within a distributed trust network, in accordance with one or more aspects of the present invention.

FIG. 3 depicts an alternate authorization flow without the use of a distributed datastore such as described above in connection with FIG. 2. In this example, service provider system 200 of the distributed trust network 100 may be responsible for storing and validating against a stored public key at the service provider. As in the above example, the process assumes that the registration process has already been completed, and that the salt was stored on the secure device 101. When a resource requiring authentication is needed, the user device retrieves the stored salt value from internal storage 310, and uses freshly obtained biometric data and the retrieved salt to regenerate in real time the private key 311 initially provided as part of the registration process. Since the salt is unchanged from the initial registration process, the generated private key will match the initially generated public key of the registration process once the biometric data is refreshed into the secure device. The generated private key is used to digitally sign the resource request 312, and the signed resource request is sent to the desired service provider system 313. The service provider system receiving the signed request fetches the public key for the given identity from, for instance, internal storage 314 and uses the public key to decrypt the request 315. If the keys match, and the request can be decrypted, then the request is considered valid and the requested resource is fetched 317, for instance, via a resource controller 202. The requested resource is then returned to the user 318. If the request is unable to be decrypted, then the resource request is rejected 316, and an appropriate notice is returned to the user device 101.

Figure 4:
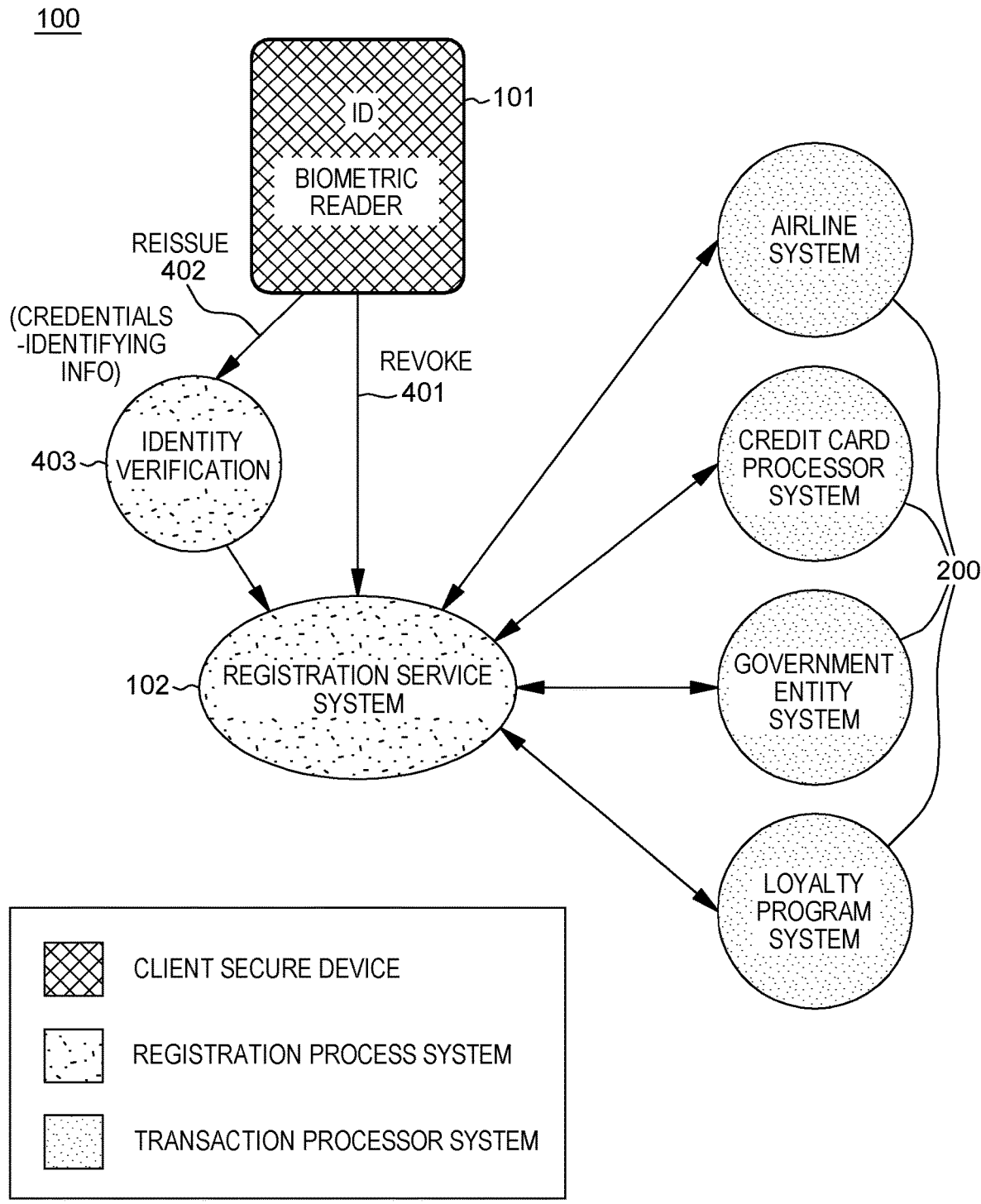
FIG. 4 depicts one embodiment of a biometric-based key revocation process within a distributed trust network, in accordance with one or more aspects of the present invention.

FIG. 4 depicts an example of biometric-based key revocation processing within a distributed trust network, such as distributed trust network 100 discussed above. As illustrated in FIG. 4, distributed trust network 100 may include (in one embodiment only) one or more user devices 101, which are client secure devices, as well as, in this embodiment, one or more registration service systems 102, which may be, for instance, cloud-based systems, and multiple service provider systems 200, which may be transaction providers and might include, by way of example only, an airline provider system, credit card processor system, government entity system, a loyalty program system, etc. Since the service provider systems 200 fetch public keys from, for instance, a common database, which may be a distributed datastore within the distributed trust network 100, revoking a public key prevents authentication from occurring with a compromised public key private key pair. For instance, in one or more implementations, each service provider system 200 may be required to delete retrieved public keys every few minutes, few hours, few days, etc. as appropriate for a particular application. By way of example, should a private key be suspected of being compromised, then the user can send a signed request to revoke the stored public key 401. This request to revoke may be signed by the current or existing private key. Once validated, the public key may be marked as revoked, for instance, in the distributed datastore. The user may then complete the registration process again, for instance, as outlined in FIG. 1, to register a new public key. In one or more implementations, should a user complete the registration process while there is a stored public key for the same identity, then the older public key may be automatically revoked.

As illustrated in FIG. 4, the user reissues 402 proof of identity, which is then verified 403 and related by the registration service system to the user's new public key. For instance, the process may include providing a response by the user to a proof of identity challenge, and generating a new salt and storing the new salt on the secure device. The secure device may obtain fresh biometric data of the user from user biometrics, again absent storing of the biometric data in persistent storage. The new public key private key pair may then be generated based on the stored new salt and the fresh biometric data. The response to the proof of identity challenge may be signed using the generated new private key and the digitally signed response may be sent along with the generated new public key to, for instance, the authentication service system to allow the authentication service system to use the new public key to decrypt the signed response and verify the signed response as accurate to allow the new public key to be linked to the user's identity, replacing the previously provided public key.

Those skilled in the art will note from the above description that provided herein are methods, systems and computer program products for facilitating generating a revocable public key at a secure device based, at least in part, on user biometrics. The method may include: generating a salt, and storing the salt on the secure device; generating a public key and private key pair based on the stored salt and biometric data for a user of the device; sending the public key to an authentication service system for registration, where the authentication service system links the public key to the user's identity. Based on the user requesting to access a protected resource via the authentication or registration service system, the method may include: regenerating the private key based on the stored salt and freshly obtained biometric data; signing a request for the protected resource using the regenerated private key; and sending the signed request to the authentication or registration service for validation against the public key, where if the authentication service successfully validates a signed request against the public key, the authentication service provides the requested protected resource to the user. Note that for each use of the biometric data, the biometric data is freshly obtained, for instance, using a biometric reader. In this way, the biometric data is never stored in persistent storage or memory on the secure device, or any other location within the trusted network.

Further, as noted herein, the method may include, based on the user requesting to revoke the public key and register a new public key with the registration service system, receiving a proof of identity challenge from the registration service system. Based on providing a response to the proof of identity challenge from the user at the secure device, the method includes generating a new salt, and storing the new salt on the secure device, as well as generating a new public key and private key pair based on the stored new salt and freshly obtained biometric data. The response to the proof of identity challenge is digitally signed using the generated new private key, and the signed response and the generated new public key are sent to the registration service system, where the registration service system uses the new public key to decrypt the signed response. Based on the authentication service verifying the signed response as being accurate, the new public key is linked to the user's identity, replacing the previous public key. Advantageously, the authentication or registration service system may be useable by one or a plurality of third party service provider systems for authentication of a particular transaction.

Those skilled in the art will note from the description provided herein that biometric data is not stored or transmitted using a revocable biometric-based key approach as disclosed herein. The same private key is regenerated in real time using the secure device, the stored salt on the secure device, and the user's biometric data freshly input. Identity registration and verification may use one or more proof of identity challenges to establish a connection between an individual's identity and a particular key pair. The registration process may be performed in real time, also allowing for quick key revocation and regeneration in a distributed network of trust. Multiple service provider systems can access the network of trust disclosed, removing the need for a user to register with individual service provider systems. Advantageously, the aspects disclosed herein provide a novel system of secure biometric identity, revocation and trust.

In one or more implementations, an online process may be used to facilitate proof of knowledge of identity, for instance, via a broad set of personally identifiable data to validate the initial certification registration. Further, in one or more embodiments, the distributed trust network may function via a quorum to ensure that compromising a subset of the network (e.g., a single entity) does not result in the entire network becoming untrustworthy. At no time is the private key or the biometric data maintained in persistent storage within the network. Advantageously, the public key and private key pair disclosed herein may be readily revoked, without compromising the underlying biometric data used in the process.

Exemplary embodiments of one or more computing environments which may implement one or more aspects of the present invention are described below with reference to FIGS. 5-7.

Figure 5:
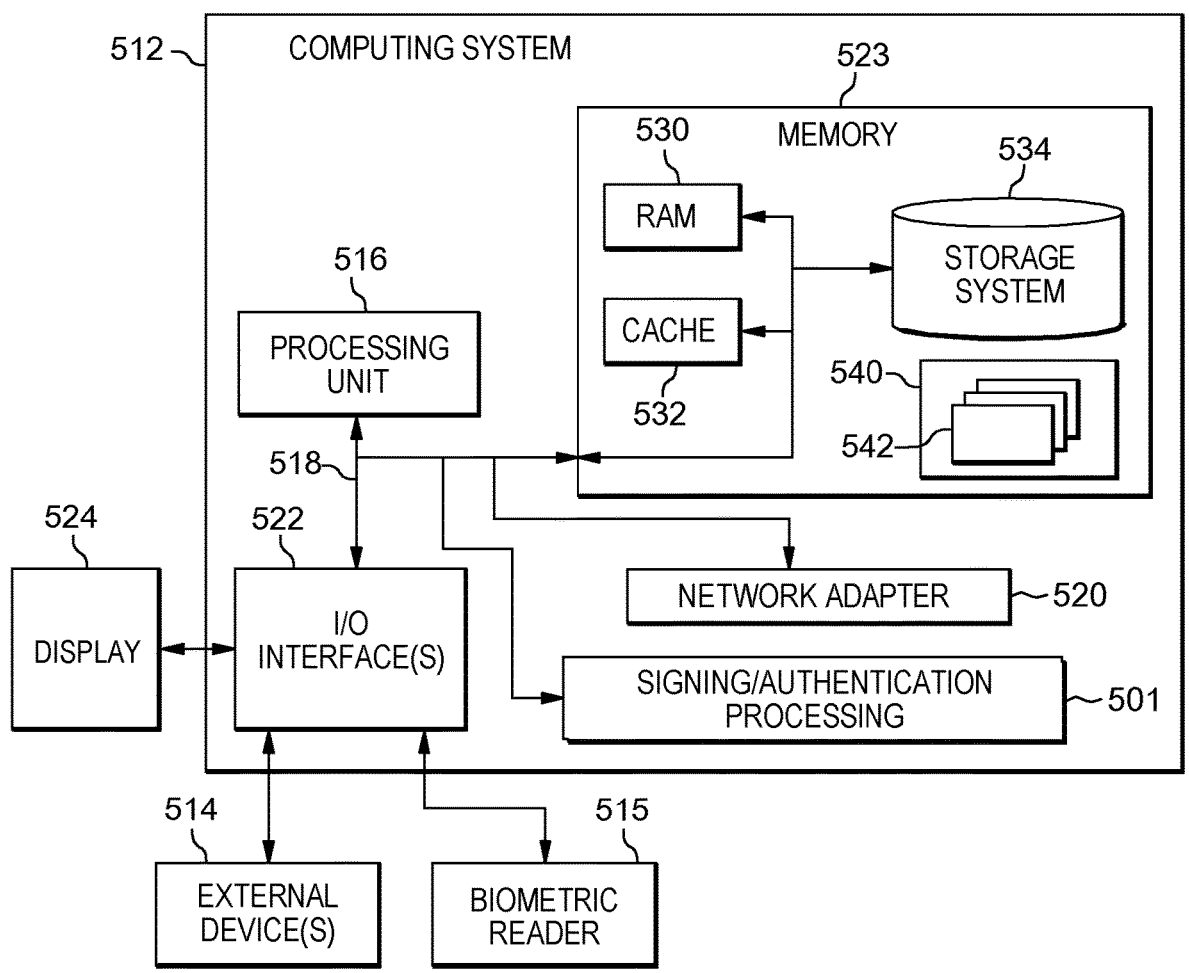
FIG. 5 depicts one embodiment of a computing environment which may implement or facilitate implementing one or more aspects of processing, in accordance with one or more aspects of the present invention.

By way of further example, FIG. 5 depicts one embodiment of a computing environment 500, which includes a computing system 512. Examples of well-known computing systems, environments, and/or configurations that may be suitable for use with computer system 512 include, but are not limited to, a server, a desktop computer, a workstation, a mobile device, such as a wireless computer, a handheld or laptop computer or device, a mobile phone, a programmable consumer electronic device, a tablet, a personal digital assistant (PDA), or the like.

Computing system 512 may be described in the general context of computer system-executable instructions, such as program modules, being executed by a computer system. Generally, program modules may include routines, programs, objects, components, logic, data structures, and so on that perform particular tasks or implement particular abstract data types.

As depicted in FIG. 5, computing system 512, is shown in the form of a general-purpose computing device. The components of computing system 512 may include, but are not limited to, one or more processors or processing units 516, a system memory 523, and a bus 518 that couples various system components including system memory 523 to processor 516.

In one embodiment, processor 516 may be based on the z/Architecture® offered by International Business Machines Corporation, or other architectures offered by International Business Machines Corporation or other companies. z/Architecture® is a registered trademark of International Business Machines Corporation, Armonk, N.Y., USA. One embodiment of the z/Architecture® is described in "z/Architecture® Principles of Operation," IBM Publication No. SA22-7832-10, March 2015, which is hereby incorporated herein by reference in its entirety.

In other examples, it may be based on other architectures, such as the Power Architecture offered by International Business Machines Corporation. One embodiment of the Power Architecture is described in "Power ISA™ Version 2.07B," International Business Machines Corporation, Apr. 9, 2015, which is hereby incorporated herein by reference in its entirety. POWER ARCHITECTURE is a registered trademark of International Business Machines Corporation, Armonk, N.Y., USA. Other names used herein may be registered trademarks, trademarks, or product names of International Business Machines Corporation or other companies.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing system 512 may include a variety of computer system readable media. Such media may be any available media that is accessible by computing system 512, and it includes both volatile and non-volatile media, removable and non-removable media.

System memory 523 can include computer system readable media in the form of volatile memory, such as random access memory (RAM) 630 and/or cache memory 532. Computing system 512 may further include other removable/non-removable, volatile/non-volatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media could be provided. In such instances, each can be connected to bus 518 by one or more data media interfaces. As described below, memory 523 may include at least one program product having a set (e.g., at least one) of program modules that are configured to carry out the functions of embodiments of the invention.

Program/utility 540, having a set (at least one) of program modules 542, may be stored in memory 523 by way of example, and not limitation, as well as an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the invention as described herein. Alternatively, a separate digital signing and/or authentication processing system, module, logic, etc., 501 may be provided within computing environment 512.

Computing system 512 may also communicate with one or more external devices, such as a keyboard 514, a biometrics reader 515, a pointing device, a display 524, etc.; one or more devices that enable a user to interact with computing system 512; and/or any devices (e.g., network card, modem, etc.) that enable computing system 512 to communicate with one or more other computing devices. Such communication can occur via Input/Output (I/O) interfaces 522. Still yet, computing system 512 can communicate with one or more networks such as a local area network (LAN), a general wide area network (WAN), and/or a public network (e.g., the Internet) via network adapter 520. As depicted, network adapter 520 communicates with the other components of computing system, 512, via bus 518. It should be understood that although not shown, other hardware and/or software components could be used in conjunction with computing system 512. Examples, include, but are not limited to: microcode, device drivers, redundant processing units, external disk drive arrays, RAID systems, tape drives, and data archival storage systems, etc.

One or more aspects may relate to or use cloud computing.

It is understood in advance that although this disclosure includes a detailed description on cloud computing, implementation of certain teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

A cloud computing node may include a computer system/server, such as the one depicted in FIG. 5. Computing system 512 of FIG. 5 may be practiced in distributed cloud computing environments where tasks are performed by remote processing devices that are linked through a communications network. In a distributed cloud computing environment, program modules may be located in both local and remote computer system storage media including memory storage devices. Computing system 512 is capable of being implemented and/or performing any of the functionality set forth hereinabove.

Figure 6:
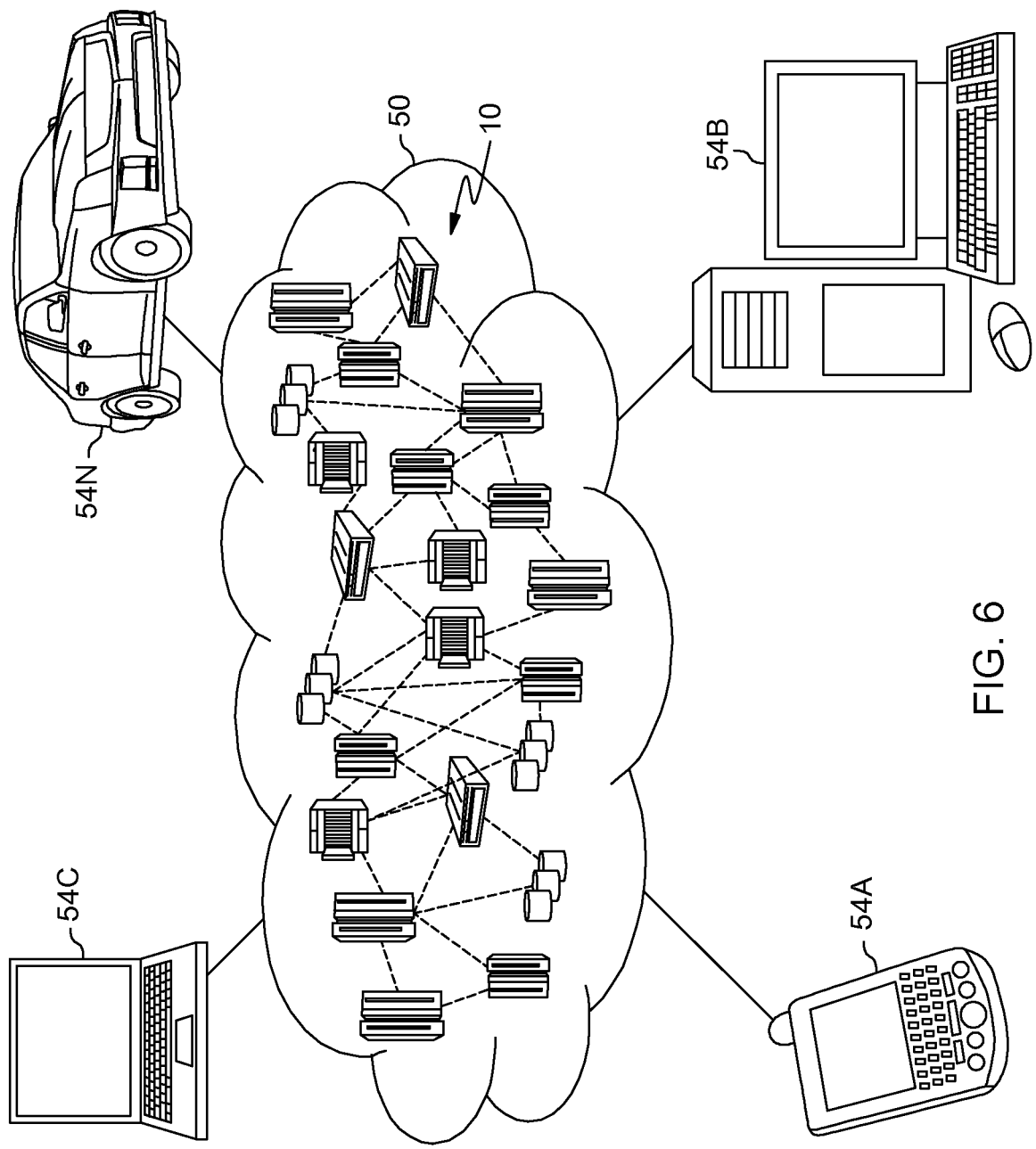
FIG. 6 depicts one embodiment of a cloud computing environment which may facilitate implementing, or be used in association with one or more aspects of the present invention.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 7:
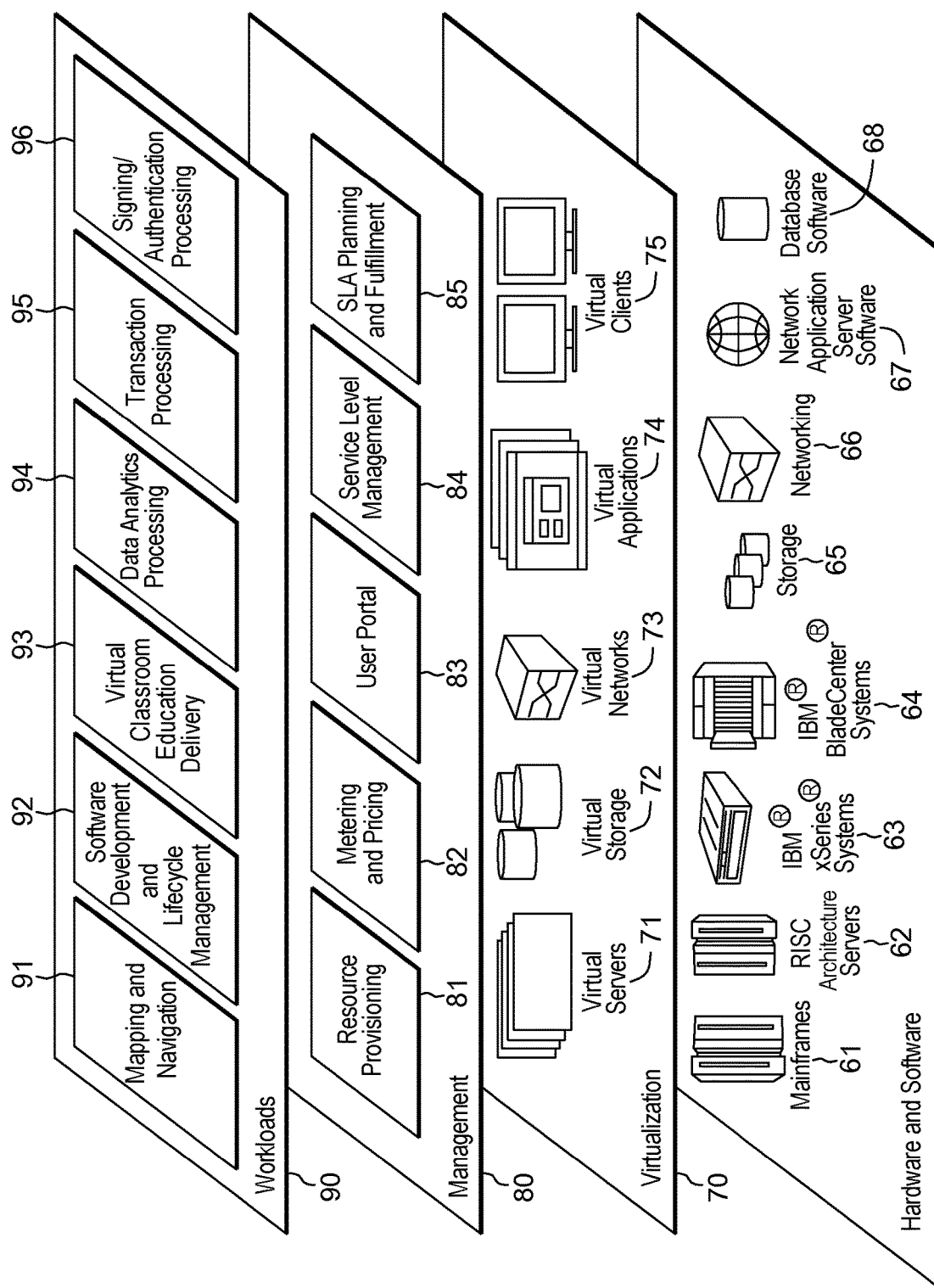
FIG. 7 depicts an example of extraction model layers, which may facilitate implementing digital signing and/or authentication processing, in accordance with one or more aspects of the present invention.

Referring to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided.

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and digital signing and/or authentication processing 96.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the invention for various embodiments with various modifications as are suited to the particular use contemplated.

What is claimed is:

1. A method comprising:

sending, by a secure device, a request to a registration system to register a user identity, the registration system, an identification service system, and one or more service provider systems forming at least part of a distributed trust network;

based on sending the request to the registration system, receiving at the secure device from the registration system a challenge generated by the identification service system of the distributed trust network, the challenge containing one or more questions having one or more answers known by the user requesting registration;

based on receiving the challenge generated by the identification service system, generating a revocable public key at the secure device, the generating comprising:

generating a salt, and storing the salt on the secure device;

temporarily obtaining, by the secure device, biometric data of the user of the secure device, the biometric data being obtained from user biometrics, and the temporarily obtaining being absent storing of the biometric data in persistent storage;

generating at the secure device a public key and private key pair based, at least in part, on the stored salt and the biometric data obtained from the user, and discarding the private key after generating at the secure device the public key and the private key pair;

completing, at the secure device, the challenge to obtain a challenge response; and digitally signing the challenge response using the private key;

transmitting the digitally signed challenge response and the public key to the registration system for providing to the identification service system for verification, and based thereon, for registration by the registration system of the distributed trust network to facilitate linking the public key to the user's identity as a registered public key for subsequent use in accessing a protected resource of the one or more service provider systems; and requesting access by the user, via the secure device, to the protected resource of the one or more service provider systems, the requesting comprising:

temporarily obtaining, by the secure device, fresh biometric data of the user of the secure device;

regenerating, in real time at the secure device, only the private key based on the stored salt and the obtained fresh biometric data of the user, the fresh biometric data being obtained from newly ascertained user biometrics, and being absent storing of the freshly obtained biometric data in persistent storage;

digitally signing, by the secure device, a request for the protected resource using the regenerated private key; and sending the signed request to a service provider system of the one or more service provider systems of the distributed trust network for validation by the service provider system against the registered public key.

2. The method of claim 1, wherein the public key is available for retrieval by the service provider system from a datastore of the distributed trust network.

3. The method of claim 1, wherein generating the salt comprises randomly generating the salt, and generating the public key and private key pair comprises hashing the stored salt and the biometric data in generating the public key and private key pair.

4. The method of claim 1, wherein the temporarily obtaining comprises ascertaining the user biometrics via a biometric reader of the secure device.

5. The method of claim 1, further comprising:

based on the user requesting to revoke the registered public key, and register a new public key with the registration system:

providing on the secure device a response by a user to a proof of identity challenge;

generating a new salt, and storing the new salt on the secure device;

temporarily obtaining, by the secure device, fresh biometric data of the user from fresh user biometrics, absent storing of the fresh biometric data in persistent storage;

generating a new public key and private key pair based, at least in part, on the stored new salt and the fresh biometric data;

digitally signing the response to the proof of identity challenge using the generated new private key; and transmitting the signed response and the new public key to the registration system to allow the registration system to use the new public key to decrypt the signed response and verify the signed response as accurate to allow the new public key to be linked to the user's identity, replacing the previously registered public key.

6. The method of claim 5, further comprising sending by the secure device to the registration system a signed request to revoke the public key, the signed request being digitally signed using the private key.

7. A system for facilitating, at least in part, digital signing, the system comprising:
a memory; and
a processing circuit communicatively coupled to the memory, wherein the system performs a method comprising:
sending, by a secure device, a request to a registration system to register a user identity, the registration system, an identification service system, and one or more service provider systems forming at least part of a distributed trust network;
based on sending the request to the registration system, receiving at the secure device from the registration system a challenge generated by the identification service system of the distributed trust network, the challenge containing one or more questions having one or more answers known by the user requesting registration;
based on receiving the challenge generated by the identification service system, generating a revocable public key at the secure device, the generating comprising:
generating a salt, and storing the salt on the secure device;
temporarily obtaining, by the secure device, biometric data of the user of the secure device, the biometric data being obtained from user biometrics, and the temporarily obtaining being absent storing of the biometric data in persistent storage;
generating at the secure device a public key and private key pair based, at least in part, on the stored salt and the biometric data obtained from the user, and discarding the private key after generating at the secure device the public key and the private key pair;
completing, at the secure device, the challenge to obtain a challenge response; and
digitally signing the challenge response using the private key;
transmitting the digitally signed challenge response and the public key to the registration system for providing to the identification service system for verification, and based thereon, for registration by the registration system of the distributed trust network to facilitate linking the public key to the user's identity as a registered public key for subsequent use in accessing a protected resource of the one or more service provider systems; and
requesting access by the user, via the secure device, to the protected resource of the one or more service provider systems, the requesting comprising:
temporarily obtaining, by the secure device, fresh biometric data of the user of the secure device;
regenerating, in real time at the secure device, only the private key based on the stored salt and the obtained fresh biometric data of the user, the fresh biometric data being obtained from newly ascertained user biometrics, and being absent storing of the freshly obtained biometric data in persistent storage;
digitally signing, by the secure device, a request for the protected resource using the regenerated private key; and
sending the signed request to a service provider system of the one or more service provider systems of the distributed trust network for validation by the service provider system against the registered public key.

8. The system of claim 7, wherein the public key is available for retrieval by the service provider system from a datastore of the distributed trust network.

9. The system of claim 7, wherein generating the salt comprises randomly generating the salt, and generating the public key and private key pair comprises hashing the stored salt and the biometric data in generating the public key and private key pair.

10. The system of claim 7, further comprising:
based on the user requesting to revoke the registered public key, and register a new public key with the registration system:
providing on the secure device a response by a user to a proof of identity challenge;
generating a new salt, and storing the new salt on the secure device;
temporarily obtaining, by the secure device, fresh biometric data of the user from fresh user biometrics, absent storing of the fresh biometric data in persistent storage;
generating a new public key and private key pair based, at least in part, on the stored new salt and the fresh biometric data;
digitally signing the response to the proof of identity challenge using the generated new private key; and
transmitting the signed response and the new public key to the registration system to allow the registration system to use the new public key to decrypt the signed response and verify the signed response as accurate to allow the new public key to be linked to the user's identity, replacing the previously registered public key.

11. The system of claim 10, further comprising sending by the secure device to the registration system a signed request to revoke the public key, the signed request being digitally signed using the private key.

12. A computer program product for facilitating, at least in part, digital signing, the computer program product comprising:
a computer readable storage medium having computer readable code embodied therewith, the computer readable program code being executable by a processor to perform a method comprising:
sending, by a secure device, a request to a registration system to register a user identity, the registration system, an identification service system, and one or more service provider systems forming at least part of a distributed trust network;
based on sending the request to the registration system, receiving at the secure device from the registration system a challenge generated by the identification service system of the distributed trust network, the challenge containing one or more questions having one or more answers known by the user requesting registration;
based on receiving the challenge generated by the identification service system, generating a revocable public key at the secure device, the generating comprising:
generating a salt, and storing the salt on the secure device;
temporarily obtaining, by the secure device, biometric data of the user of the secure device, the biometric data being obtained from user biometrics, and the temporarily obtaining being absent storing of the biometric data in persistent storage;

generating at the secure device a public key and private key pair based, at least in part, on the stored salt and the biometric data obtained from the user, and discarding the private key after generating at the secure device the public key and the private key pair;

completing, at the secure device, the challenge to obtain a challenge response; and digitally signing the challenge response using the private key;

transmitting the digitally signed challenge response and the public key to the registration system for providing to the identification service system for verification, and based thereon, for registration by the registration system of the distributed trust network to facilitate linking the public key to the user's identity as a registered public key for subsequent use in accessing a protected resource of the one or more service provider systems; and requesting access by the user, via the secure device, to the protected resource of the one or more service provider systems, the requesting comprising:

temporarily obtaining, by the secure device, fresh biometric data of the user of the secure device;

regenerating, in real time at the secure device, only the private key based on the stored salt and the obtained fresh biometric data of the user, the fresh biometric data being obtained from newly ascertained user biometrics, and being absent storing of the freshly obtained biometric data in persistent storage;

digitally signing, by the secure device, a request for the protected resource using the regenerated private key; and sending the signed request to a service provider system of the one or more service provider systems of the distributed trust network for validation by the service provider system against the registered public key.

13. The computer program product of claim 12, further comprising:

based on the user requesting to revoke the registered public key, and register a new public key with the registration system:

providing on the secure device a response by a user to a proof of identity challenge;

generating a new salt, and storing the new salt on the secure device;

temporarily obtaining, by the secure device, fresh biometric data of the user from fresh user biometrics, absent storing of the fresh biometric data in persistent storage;

generating a new public key and private key pair based, at least in part, on the stored new salt and the fresh biometric data;

digitally signing the response to the proof of identity challenge using the generated new private key; and transmitting the signed response and the new public key to the registration system to allow the registration system to use the new public key to decrypt the signed response and verify the signed response as accurate to allow the new public key to be linked to the user's identity, replacing the previously registered public key.

14. The computer program product of claim 13, further comprising sending by the secure device to the registration system a signed request to revoke the public key, the signed request being digitally signed using the private key.

* * * * *